United States Patent [19]

Tomino et al.

[11] 4,436,792
[45] Mar. 13, 1984

[54] CONTAINER DEVICE FOR PLANAR BATTERY

[75] Inventors: Naoki Tomino, Tokyo; Osamu Ikeda, Kawasaki; Yoshio Matsuzawa, Tokyo; Hideya Inoue, Kawasaki, all of Japan

[73] Assignee: Nippon Kogaku K.K., Tokyo, Japan

[21] Appl. No.: 440,423

[22] Filed: Nov. 9, 1982

[30] Foreign Application Priority Data

Nov. 12, 1981 [JP] Japan .......................... 56-167658[U]
Nov. 27, 1981 [JP] Japan .......................... 56-175316[U]
Nov. 27, 1981 [JP] Japan .......................... 56-175317[U]
Dec. 4, 1981 [JP] Japan .......................... 56-180654[U]

[51] Int. Cl.³ .............................................. H01M 2/10
[52] U.S. Cl. .......................................... 429/1; 429/97
[58] Field of Search ........................ 429/1, 96, 97, 98

[56] References Cited
FOREIGN PATENT DOCUMENTS 56-168355 12/1981 Japan ..................................... 429/97

*Primary Examiner*—Donald L. Walton
*Attorney, Agent, or Firm*—Fitzpatrick, Cella, Harper & Scinto

[57] ABSTRACT

A device capable of containing at least one planar battery having a positive electrode and a negative electrode and capable of supplying a power to a circuit when the battery has been completely contained includes a plurality of terminals for contacting the positive electrode and the negative electrode, respectively, of the battery when completely contained, means for holding each of the terminals, the holding means holding at least one of the terminals movably between a first position and a second position and wherein the movable terminal, when in the first position, contacts neither of the positive electrode and the negative electrode and, when in the second position, can contact one of the electrodes, and means for moving the movable terminal to the second position in response to the containment of the battery.

14 Claims, 37 Drawing Figures

CONTAINER DEVICE FOR PLANAR BATTERY

BACKGROUND OF THE INVENTION

1. Field of the Invention

This invention relates to a container device for a planar battery.

2. Description of the Prior Art

As a container device for a planar battery, there would occur to mind one in which, for example, a positive pole and a negative pole biased in the direction for contact are provided within a battery chamber so that when a planar battery inserted into the battery chamber has been completely contained, it positively contacts the electrode terminals of the battery. In such a container device, however, when the battery is inserted into the battery chamber, the battery must advance while pushing away the positive pole and negative pole contacts and this leads to the disadvantage that the friction becomes so great that it is difficult to insert the battery. In a camera or a desk top type electronic calculator using such a planar battery, when it is desired to obtain a higher voltage or a greater capacity, it may sometimes be desired that a plurality of batteries be contained while being connected in series or in parallel.

SUMMARY OF THE INVENTION

It is an object of the present invention to provide a container device whose operability has been improved by reducing the friction when a planar battery is inserted into a battery chamber.

It is another object of the present invention to provide a container device suitable for connecting a plurality of planar batteries and containing them.

It is still another object of the present invention to provide a container device which permits quick interchange of the battery.

The invention will become fully apparent from the following detailed description thereof taken in conjunction with the accompanying drawings.

DESCRIPTION OF THE PREFERRED EMBODIMENTS

Figure 1:
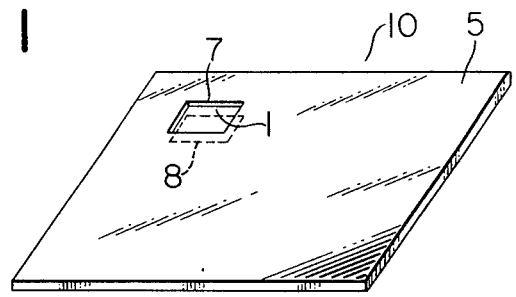
FIG. 1 is a perspective view of a thin planar battery used with the present invention.
Figure 2:
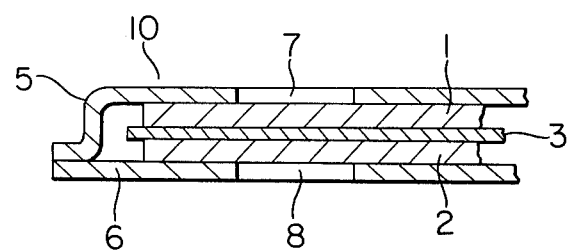
FIG. 2 is a cross-sectional view of the same battery.

Referring to FIGS. 1 and 2, there is shown an example of the planar battery. The planar battery 10 comprises a positive pole metal plate 1 having graphite fluoride or the like attached thereto, a negative pole metal plate 2 having lithium or the like attached thereto, a separator 3 sandwiched between the positive pole metal plate 1 and the negative pole metal plate 2, and synthetic resin films 5, 6 surrounding them. Similar rectangular windows 7 and 8 are formed in the films 5 and 6 at a corner thereof and said metal plates are exposed through these windows, thereby forming a positive pole terminal 1 and a negative pole terminal 2.

Figure 3:
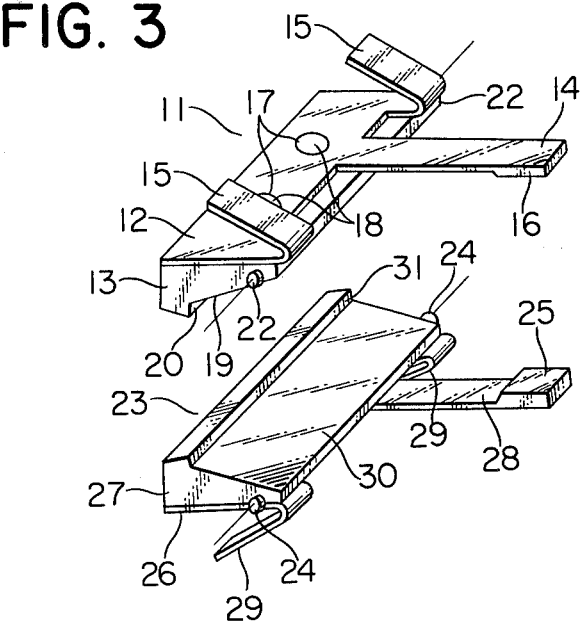
FIG. 3 is a perspective view showing an embodiment of the present invention.
Figure 4A:
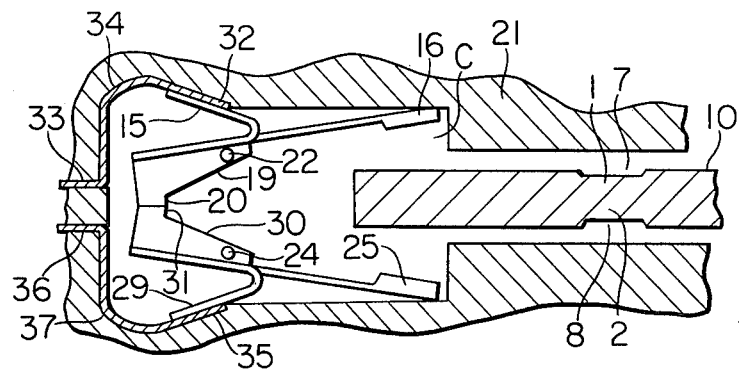
FIGS. 4A and 4B are cross-sectional views illustrating the operation of the FIG. 3 embodiment.
Figure 4B:
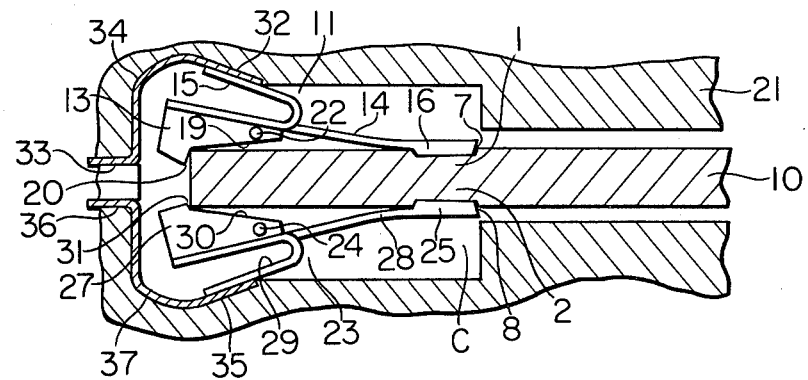

Reference is now had to FIGS. 3, 4A and 4B to describe an embodiment of the present invention. An upper contact portion 11 comprises a positive pole member 12 and an insulative support member 13. The positive pole member 12 is provided with a plate spring portion 14 which is in the form of a protrusion and two plate spring-like terminals 15 each of which is in the form of a turned-back protrusion, and a positive pole contact 16 adapted to fit in the window 7 of the battery 10 completely contained in a battery chamber C and the contact for the positive pole metal plate 1 projects from the underside of the end of the plate spring portion 14. Further, the positive pole member 12 is formed with two apertures 17 in which a projection 18 formed on the support member 13 is fitted and caulked, thereby coupling the two members 12 and 13 integrally with each other.

A cam surface 19 and a battery insertion limiting surface 20 are formed in the underside of the support member 13. The integrally coupled members 12 and 13 are rotatable about a shaft 22 supported by an insulative battery chamber wall 21.

A lower contact portion 23 is of the same structure as the upper contact portion 11, but it is rotatably supported on the battery chamber wall 21 by a shaft 24 at a position symmetric with the upper contact position 11 with respect to the inserted battery 10. Accordingly, the lower contact portion 23 has a negative pole contact 25 adapted to fit in the window 8 of the battery 1 and contact the negative pole metal plate 2. The other portions except the portions which do not appear in the drawings are designated by reference numerals 26–31.

Further, the battery chamber wall 21 has attached thereto a positive side electrically conductive member 34 having a positive side terminal 32 and a terminal 33 connected to a suitable electric circuit, not shown, and a negative side electrically conductive member 37 having a negative terminal 35 and a terminal 36 also connected to the electric circuit, and plate spring-like terminals 15 and 29 are normally in contact with the positive side terminal 32 and the negative side terminal 35, respectively.

The operation of the embodiment having the above-described construction will now be described. When the battery 10 has not yet been completely contained as shown in FIG. 4A, the support members 13 and 27 are close to each other due to the resilient properties of the plate spring-like terminals 15 and 29, and the contacts 16 and 25 lie at positions retracted to the enlarged portion of the battery chamber C, thus being spaced apart from each other. Accordingly, during the insertion process of the battery 10, the end or surface of the battery 10 never strikes against or contacts the contacts 16 and 25 and the battery 10 can be smoothly inserted without any resistance.

Next, when the battery 10 is further inserted and brought into a substantially completely contained condition, the fore end of the battery comes to bear against the cam surfaces 19 and 30 and urges the support members 13 and 17 to turn rightwardly and leftwardly, respectively, about the shafts 22 and 24 against the spring forces of the plate spring-like terminals 15 and 29. Thus, the contacts 16 and 25 begin to move toward each other and, when or immediately before the fore end of the battery comes to a position in which it strikes against the limiting surfaces 20, 31, that is, when or immediately before the battery 10 comes to its completely contained position, the contacts 16 and 25 are completely closed and come into contact with the positive pole and negative pole metal plates 1 and 2, respectively. That is, the contact portions 11 and 23 detect that the battery 10 has been substantially completely contained, and bring the contacts 16 and 25 into positive contact with the positive pole and negative pole metal plates 1 and 2. In the case of the present embodiment, this completed containment detecting means and the contacts 16 and 25 are formed by a unitary member.

In the completely contained condition shown in FIG. 4B, the plate spring portions 14 and 28 flex, whereby the contacts 16 and 25 are biased in a direction to contact the metal plates 1 and 2, thus ensuring the contact between the contacts 16, 25 and the metal plates 1, 2. In this condition, the positive pole side is connected to the positive pole metal plate 1, the positive pole contact 16, the plate spring-like terminal 15, the positive side terminal 32 and the terminal 33, and the negative pole side is connected to the negative pole metal plate 2, the negative pole contact 25, the plate spring-like terminal 29, the negative side terminal 35 and the terminal 36, whereby power is supplied to the electric circuits connected to the terminals 33 and 36, respectively. Also, in the condition shown in FIG. 4B, the contact portions 11 and 23 try to return to the position of FIG. 4A by the restitutional forces of the plate spring-like terminals 15 and 29 and exert a force on the battery 10 through the limiting surfaces 20 and 31 to the draw out the battery, but the contact pressures and engaging forces between the contacts 16, 25 and the metal plates 1, 2 and between the contacts 16, 25 and the windows 7, 8 overcome said force and hold the battery 10 in the position of FIG. 4B.

When it is desired to draw the battery 10 out of the battery chamber C, a draw-out force may be exerted on the battery 10 and the contacts 16 and 25 may be withdrawn from the windows 7 and 8, whereafter the restitutional forces of the plate spring-like terminals 15 and 29 may be exerted to enable the battery 10 to be lightly drawn out of the battery chamber C.

Figure 5A:
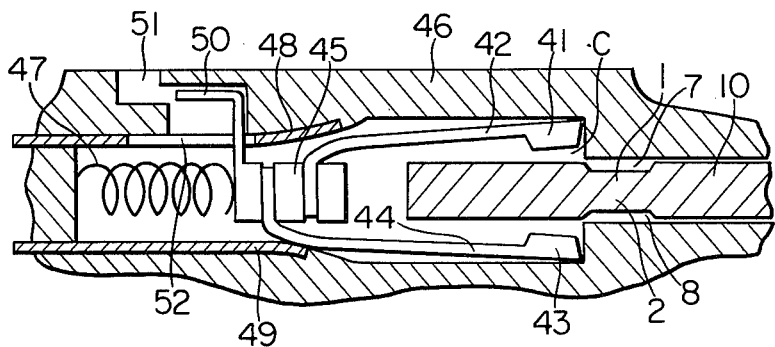
FIGS. 5A and 5B are cross-sectional views showing another embodiment of the present invention.
Figure 5B:
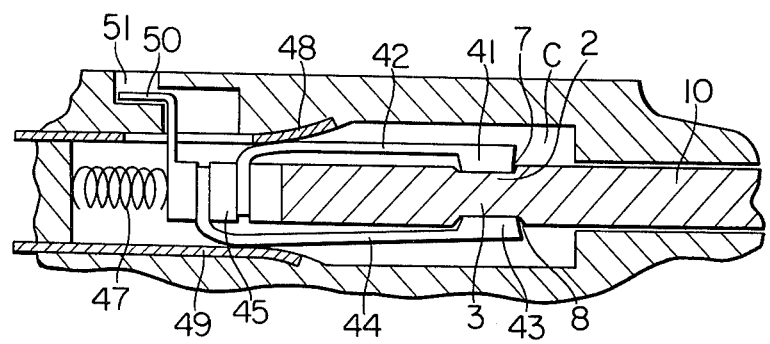

FIGS. 5A and 5B show another embodiment of the present invention.

A plate spring member 42 having a positive pole contact 41 and a plate spring member 44 having a negative pole contact 43 are supported by an insulating member 45. The insulating member 45 is supported on the inner portion of a battery chamber wall 46 by means of a spring 47. A positive side terminal 48 and a negative side terminal 49 constituting cam surfaces for contacting the plate spring members 42 and 44, respectively, are embedded in the battery chamber wall 46, and the terminals 48 and 49 are connected to a suitable electric circuit, not shown. In the present embodiment, a display portion 50 is formed in the insulating member 45, and a display window 51 through which the display portion 50 may be seen is formed in the battery chamber wall 46 and an escape hole 52 through which the display portion 50 is movable is formed in the positive side terminal 48.

The operation of the embodiment having the above-described construction will now be described. During the battery containing operation shown in FIG. 5A, the insulating member 45 is biased toward an unshown opening provided rightwardly of the battery chamber C, by the force of the spring 47; and the contacts 41 and 43 are spaced apart from each other at positions retracted to the enlarged portion of the battery chamber C by the resilient properties of the plate spring members 42 and 44.

Consequently, the battery 10 can be smoothly inserted into the battery chamber C without being hindered by the contacts 41 and 43.

When the battery 10 is further inserted until the fore end thereof strikes against the insulating member 45, the member 45 moves leftwardly as viewed in FIG. 5A against the force of the spring 47 and the plate spring members 42 and 44 begin to contact the cam surfaces of the terminals 48 and 49 and begin to close the contacts 41 and 43. When or immediately before the battery 10 comes to its completely contained position of FIG. 5B, the contacts 41 and 43 are completely closed and finally come into contact with the positive pole and negative pole metal plates 1 and 2, respectively, as shown in FIG. 5B. Simultaneously therewith, the display portion 50 integrally formed in the insulating member 45 also moves leftwardly as viewed in FIG. 5A, and this can be confirmed from outside through the display window 51 and thus, it can be confirmed that the battery 10 has been completely contained.

In the position of FIG. 5B, power is supplied to the electric circuit connected to the terminals 48 and 49. Also, in this position, the spring 47 tries to return to the position of FIG. 5A and imparts to the battery 10 through the insulating member 45 a force which tries to release the containment of the battery 10, but this force is smaller than the force which tries to stop the battery 10 due to the engagement or contact between the metal plates 1, 2 of the battery 10 and the contacts 41, 43 and between the windows 7, 8 and the contacts 41, 43 and therefore, the battery 10 is retained at the position of FIG. 5B.

When it is desired to draw out the battery 10, if a sufficient draw-out force to overcome the force by said engagement or contact is applied to the battery 10, the contacts 41 and 43 will come out of the windows 7 and 8, respectively and at the same time, the insulating member 45 will be moved rightwardly as viewed in FIG. 5A by the force of the spring 47, whereby the battery 10 may be lightly drawn out of the battery chamber C. At this time, the display portion 50 is retracted and hidden from the display window 51, whereby it can be confirmed that the battery 10 is not contained.

In the present embodiment, the display means for displaying whether the battery 10 is contained and the two contacts 41 and 43 are supported by and moved with the member 45 forming the completed containment detecting means and a spring bias force in the direction to release the containment of the battery 10 is imparted to said member 45.

Figure 6A:
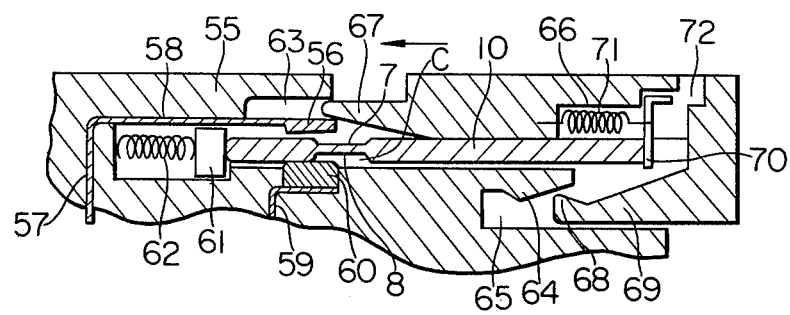
FIGS. 6A and 6B are cross-sectional views showing still another embodiment of the present invention.
Figure 6B:
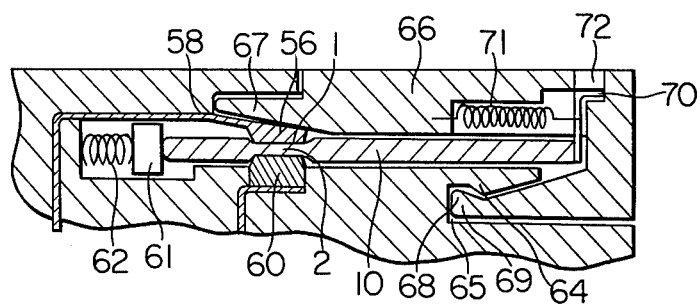

FIGS. 6A and 6B show still another embodiment of the present invention. A plate spring member 58 integrally having a positive pole contact 56 and a positive side terminal 57 is supported on a battery chamber wall 55 and a negative pole contact 60 connected to a negative side terminal 59 is embedded in the battery chamber wall 55.

A member 61 constituting completed containment detecting means is supported on the inner portion of the battery chamber wall 55 by means of a spring 62. The battery chamber wall 55 is formed with a cut-away 63 and a recess 65 having an engaging projection 64 and correspondingly thereto, a lid member 66 is formed with a protrusion 67 having a cam surface and a protrusion 69 having an engaging projection 68. The lid member 66 has a display member 70 attached thereto by means of a spring 71 and is also formed with a display window 72 for the display member 70.

The operation of the embodiment having the above-described construction will now be described. In a condition in which the battery chamber C is not covered with the lid member 66, the contacts 56 and 60 are open due to the resilient property of the plate spring member 58 and the battery 10 may be substantially smoothly inserted between these contacts 56 and 60. At this point, as shwon in FIG. 6A, with the cut-away 63 opposed to the tapered protrusion 67 and with the recess 65 opposed to the protrusion 69, the lid member 66 is shifted in the direction of the arrow indicated in FIG. 6A. Thereupon, the contact 56 begins to move toward the other contact 60 with the aid of the cam surface of the protrusion 67 and, since the force of the spring 62 is greater than the force of the spring 71, the display member 70 is pushed by the rear end of the battery 10 and begins to move toward a position in which it is seen through the display window 72. As the lid member 66 is further shifted, the member 61 supported by the spring 62 is pushed leftwardly as viewed in FIG. 6A by the fore end of the battery and, by the completion of containment whereat the windows 7 and 8 of the battery 10 come to the positions in which they are opposed to the contacts 56 and 60, the contact 56 has been completely held down by the cam surface of the protrusion 67 and connected to the battery 10, and the projection 68 rides over the projection 64 while the protrusion 69 completely fits into the recess 65. In the position of FIG. 6B wherein the positive pole and negative pole contacts 56 and 60 are thus positively in contact with the positive pole and negative pole metal plates 1 and 2, respectively, the battery 10 and the lid member 66 are held in the completely contained condition by the engagement between the projection 68 of the protrusion 69 and the projection 64 of the recess 65 against the biasing force of the spring 62 acting in the containment releasing direction.

When it is desired to draw the battery 10 out of the battery chamber C, a force in the disengaging direction may be applied to the lid member 66 to bring the protrusion 69 out of engagement with the recess 65, whereupon the contact 56 tries to return to the position of FIG. 6A due to the resilient property of the plate spring member 58 while, at the same time, the battery 10 and the lid member 66 begin to be pushed rightwardly as viewed in FIG. 6B by the member 61, so that the battery can be semiautomatically drawn out. Thus, the operability of the interchange of the battery is improved.

Although, in the present embodiment, the display member 70 is provided for displaying the presence or absence of the battery 10 in the battery chamber, design may also be made such that the battery 10 itself can be confirmed through the window 72.

In the present embodiment, the holding means 65, 69 for fixing the battery 10 against the spring bias force acting in the containment releasing direction is operatively associated with the completed containment detecting means 61, 67.

Figure 7A:
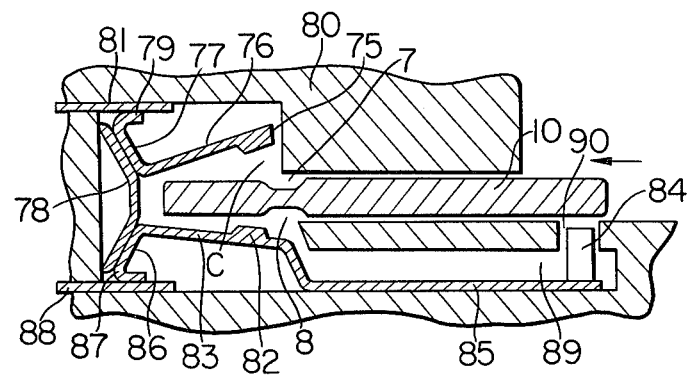
FIGS. 7A, 7B and 7C are cross-sectional views showing yet another embodiment of the present invention.
Figure 7B:
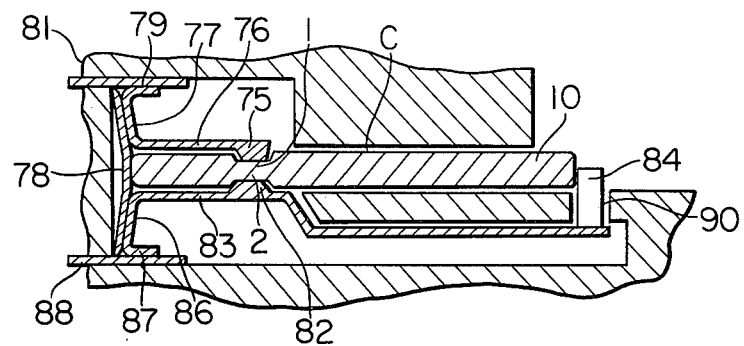
Figure 7C:
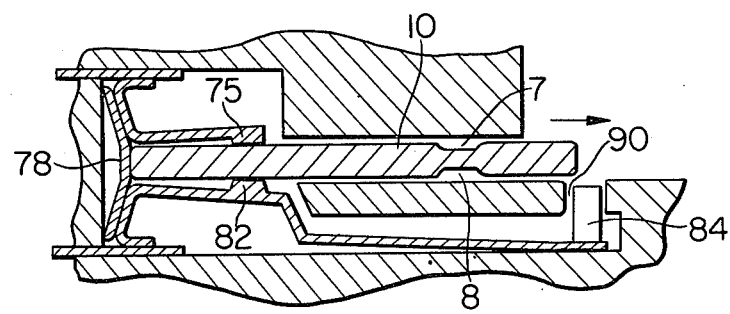

FIGS. 7A, 7B and 7C show yet another embodiment of the present invention. A plate spring member 76 having a positive pole contact 75 formed at the fore end thereof is secured at a connecting portion 77 to a resilient insulating member 78. The other end of the plate spring member 76 provides a terminal portion 79 which is normally in contact with a positive side terminal 81 fixed to a battery chamber wall 80.

On the other hand, a plate spring member 83 having a negative pole contact 82 is similar in construction to the plate spring member 76 except that a resilient arm 85 having a pin 84 coupled to the fore end thereof extends from the portion of the negative pole contact 82, and the two plate spring members 76 and 83 are disposed symmetrically with respect to the battery 10 inserted into the battery chamber C. That is, the plate spring member 83 also has a connecting portion 86 and a terminal portion 87, which is normally in contact with a negative side terminal 88 fixed to the battery chamber wall 80.

A space 89 for enabling the arm 85 to move therein and a hole 90 communicating with the space 89 through which the pin 84 may project outwardly are formed in the battery chamber wall 80.

The operation of the embodiment having the above-described construction will now be described. When the battery is not yet contained or during the battery containing process as shown in FIG. 7A, the two contacts 75 and 82 are open due to the resilient property of the insulating member 78. Accordingly, the battery 10 can be smoothly inserted without receiving any great contact resistance during its containment process. At this time, the pin 84 is in the hole 90 and does not hinder the insertion of the battery.

When the battery 10 is inserted correctly in the direction of the arrow indicated in FIG. 7A as will fully be described later, the fore end of the battery 10 comes to bear against the insulating member 78 and causes it to flex against the resilient property and, along therewith, the plate spring members 76 and 83 coupled thereto at the connecting portions 77 and 86 begin to be closed. As a result, when the battery 10 comes to or just before the completed containment position, the contacts 75 and 82 come to their closed position in which they are positively in contact with the positive pole and negative pole metal plates 1 and 2, whereby the position of FIG. 7B is realized. At this time, the movement of the negative pole contact 82 is enlarged to move the pin 84 in response thereto, so that the head of the pin juts out of the hole 90 to hold down the rear end of the battery 10. In this condition, the positive pole side is connected to the positive pole metal plate 1, the positive pole contact 75, the terminal portion 79 and the positive side terminal 81, and the nagative pole side is connected to the negative pole metal plate 2, the negative pole contact 82, the terminal portion 87 and the negative side terminal 88, and power is supplied to the electric circuit connected to the terminals 81 and 88.

Figure 8A:
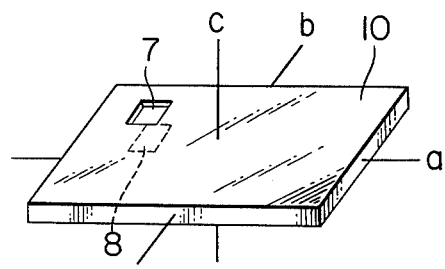
FIGS. 8A, 8B, 8C and 8D are views for illustrating the embodiment shown in FIG. 7.
Figure 8B:
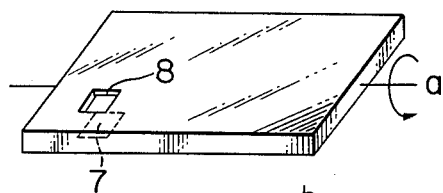
Figure 8C:
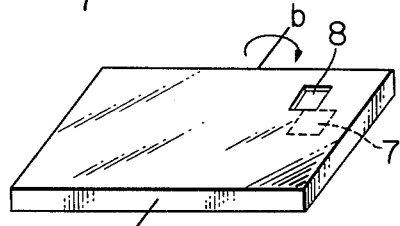
Figure 8D:
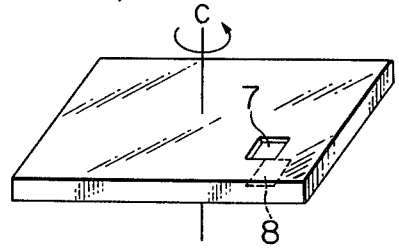

When it is desired to draw the battery 10 out of the battery chamber C, if the head of the pin 84 is pushed, the battery 10 will jump out due to the resilience of the insulating member 78. That is, the resilience of the insulating member 78 is set to a value greater than the frictional engagement force between the contacts 75, 82 and the windows 7, 8 and between the contacts 75, 82 and the metal plates 1, 2.

Where the battery insertion is not correct and for example, the battery 10 is reversely contained as shown in FIG. 7C, the contacts 75 and 82 do not fall into the windows 7 and 8 and the movement of the negative pole contact 82 is not sufficiently great. Accordingly, the movement of the pin 84 neither becomes so great that the head thereof juts out of the hole 90, and the battery 10 is not fixed to the completely contained position but jumps out due to the resilience of the insulating member 78. This also holds true in case one mistakes the obverse surfaces and reverse of the battery 10. Thus, in the present embodiment, if the battery is inserted incorrectly, it cannot be contained and the contacts 75 and 82 are so positioned in the battery chamber C. An example of the battery 10 used for the present embodiment is shown in FIGS. 8A, 8B, 8C and 8D. That is, when the three axes of symmetry of the battery 10 are a, b and c as shown in FIG. 8A, the electrode windows 7 and 8 of the battery 10 are provided at such positions that the battery 10 does not configurationally restore its original condition when it is rotated through 180° about each axis a, b, c as shown in FIGS. 8B, 8C and 8D.

As described above, in the present embodiment, the pin 84 comes out of the hole 90 only when the battery 10 has been correctly contained and therefore, it not only acts as the holding means for the battery 10 but also can be utilized as the completed containment displaying means for enabling electrical conduction to be confirmed.

While no lid is provided in the present embodiment, it is also possible to provide a suitable lid.

In the present invention, each contact may be brought into contact with the electrode of the planar battery when the planar battery has been completely contained in the battery chamber, or each contact may be brought into contact with the electrode or the surface of the planar battery just before the completion of the containment. That is, it will suffice if, in the process wherein the planar battery is inserted into the battery chamber, the contacts do not provide a contact resistance which hinders the insertion of the planar battery and when the battery has been substantially completely contained, each contact can contact the electrode of the planar battery.

Figure 9:
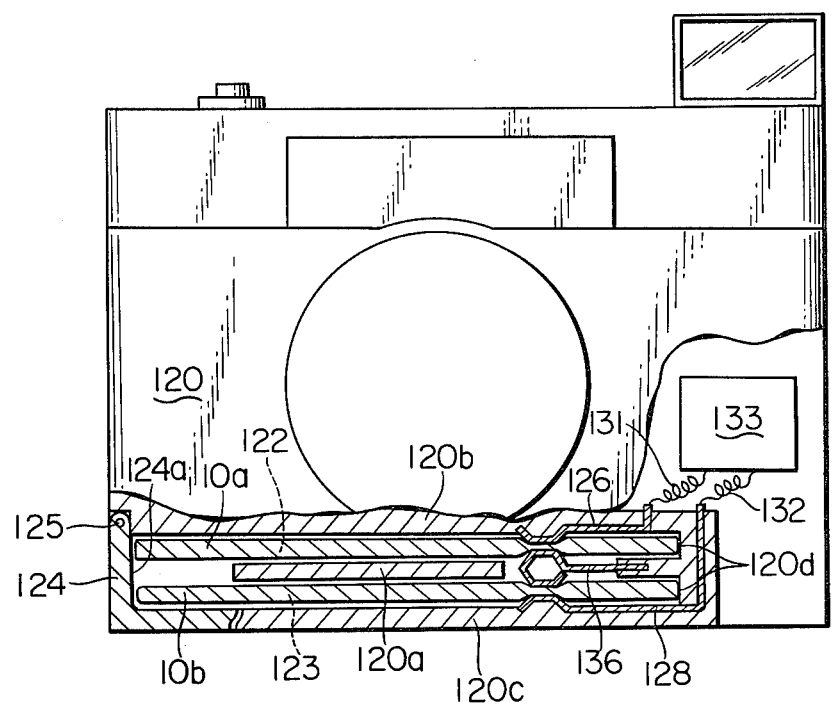
FIG. 9 is a view partly in cross section showing a condition in which another embodiment of the present invention is applied to a camera.
Figure 10:
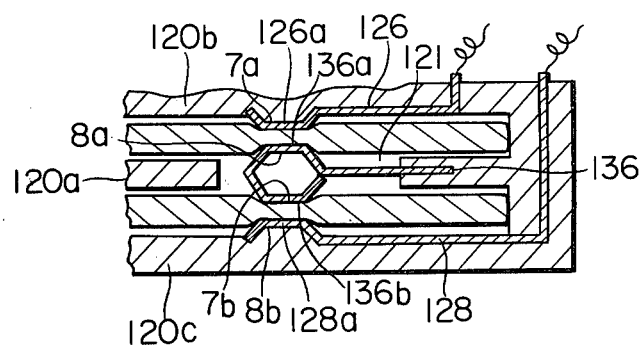
FIG. 10 is an enlarged view of a portion of FIG. 9.
Figure 11A:
FIGS. 11A–11F are cross-sectional views showing various modifications of the contact.

Reference is now had to FIGS. 9 and 10 to describe a further embodiment of the present invention. A battery chamber formed at the bottom of a camera body 120 is divided into a first battery chamber 122 and a second battery chamber 123 by a partition 120a comprising a portion of the body 120, and the opening thereof may be opened and closed by a lid 124 rotatable about a shaft 125. A contact member 126 for the positive pole is secured to the ceiling 120b of the battery chamber 122 and a contact member 128 for the negative pole is secured to the floor 120c of the battery chamber 122, and these contact members are connected to an electric circuit 133 through lead wires 131 and 132. Contacts 126a and 128a are formed on the ends of the contact members 126 and 128, respectively. The partition 120a is formed with an opening 121 centrally thereof, to which a contact member 136 for the positive and negative poles is secured. This contact member, as shown in FIG. 11A, comprises an end edge of a metal plate generally curved into an elliptical shape and supported in a cantilever fashion, and the upper portion 136a thereof provides a contact for the negative pole which projects into the battery chamber 122 and the lower portion 136b thereof provides a contact for the positive pole which projects into the battery chamber 123. The two contacts 136a and 136b are displaceable toward each other by their resiliency.

Where the battery 10 (see FIGS. 1 and 2) is to be contained in such container device, the lid 124 is opened and batteries 10a and 10b (actually identical to the battery 10) are inserted into the first battery chamber 122 and the second battery chamber 123, respectively, without mistaking the obverse and reverse surfaces thereof (namely, with the positive pole terminal 1 facing upward). The battery 10a in the battery chamber 122 has its position in the direction of insertion (the left to right direction in FIG. 9) controlled by the fore end thereof bearing against the wall surface 120d of the body and the positive pole contact 126a and the negative pole contact 136a fitting into the windows 7 and 8, respectively. At this time, the contact 136a for the negative pole of the contact member 136 is resiliently deformed downwardly (as viewed in FIG. 10) to permit the insertion of the battery 10a. The positioning of the battery 10a in the direction of thickness (the vertical direction in FIG. 9) is accomplished by the ceiling 120b and partition 120a of the body, and the positioning of the battery 10a in the widthwise direction (the direction perpendicular to the plane of the drawing sheet of FIG. 9) is accomplished by an unshown side wall of the body.

The positioning, in each direction, of the battery 10b inserted in the battery chamber 123 is generally similar to what has been described just above, with the exception that during the insertion of the battery 10b, the contact 136b for the positive pole of the contact member 136 is resiliently deformed upwardly and that the positioning of the battery in the direction of thickness is accomplished by the partition 120a and the floor 120c.

If the lid 124 is closed after the batteries 10a and 10b have been inserted into the battery chambers 122 and 123, respectively, the inner surface 124a of the lid comes into contact with the rear end surface of the batteries. The voltages of the batteries 10a and 10b are taken out from the circtuit 133 through the contacts 126a, 128a, 136 and lead wires 131, 132.

Figure 11B:
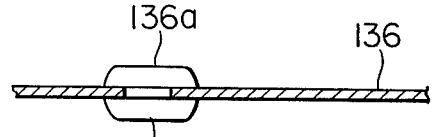
Figure 11C:
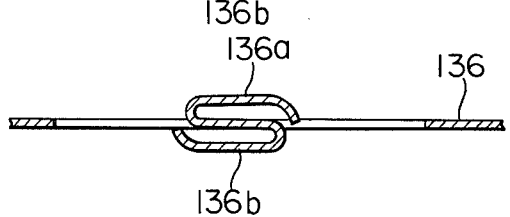
Figure 11D:
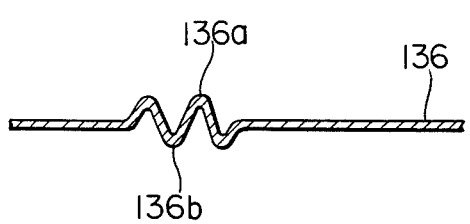

The removal of the batteries 10a and 10b can be readily accomplished by picking the rear end portions of the batteries because these rear end portions jut out of the battery chambers 122 and 123 if the lid 124 is opened. At this time, the contacts 136a and 136b of the contact member 136 are of course resiliently deformed downwardly or upwardly.

Where the contacts 126a and 128a of the ceiling 120b and the floor 120c have no resilient deformability as in the foregoing example, it is necessary to endow the contact member 136 of the partition 120a with resilient deformability, but instead of the contact member 136, it is possible to adopt a contact member 136 having a contact 136a for the negative pole and a contact 136b for the positive pole formed by applying punching and bending works to a metal plate as shown in FIG. 11C, or a contact member 136 having a contact 136a for the negative pole and a contact 136b for the positive pole formed by applying a bending work to a metal plate as shown in FIG. 11D. In short, the contacts, 136a and 136b should only be resiliently deformable in the direction of thickness of the batteries during the insertion and removal of the batteries 10a and 10b.

Figure 12A:
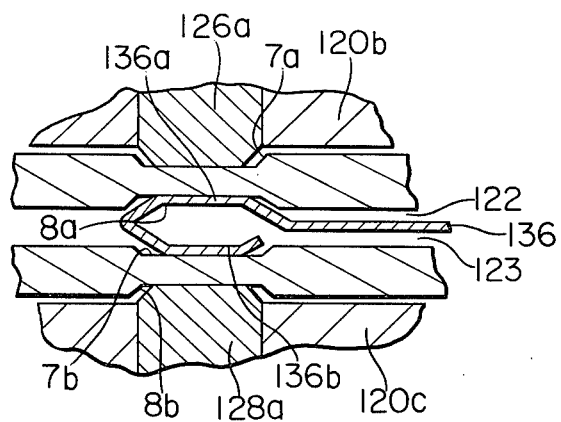
FIGS. 12A–12C are fragmentary cross-sectional views showing modifications of the present invention.

Also, if the contacts 136a and 136b of the contact member 136 are thus endowed with resilient deformability, the contact 126a of the ceiling 120b and the contact 128a of the floor 120c may be fixed type ones comprising shaft-like members as shown in FIG. 12A. Here, the partition 120a is eliminated and a cantiliver-like contact member 136 having the right end thereof directly supported on the camera body 120 also serves the function as a partition.

Figure 12B:
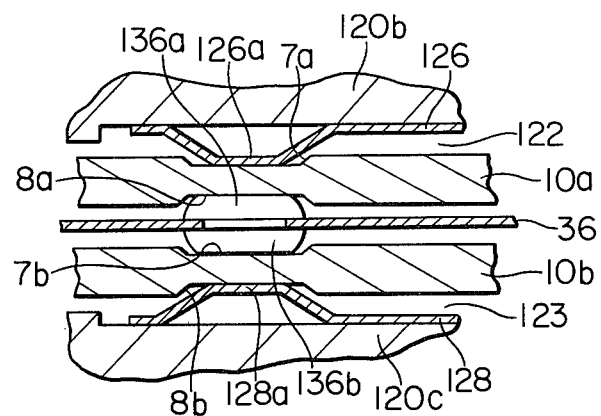
Figure 12C:
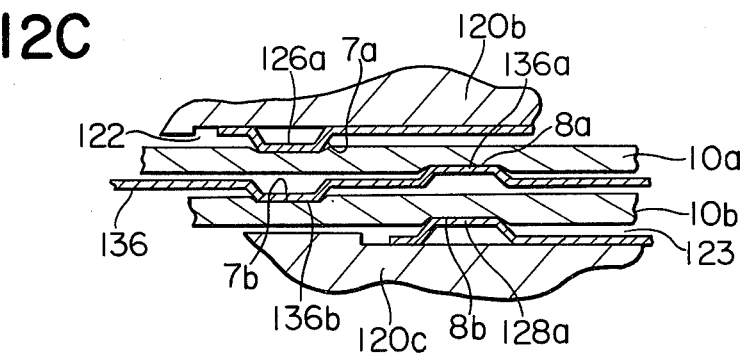

The various contacts may be such as shown in FIG. 12B or 12C. That is, in FIG. 12B, a contact member 126 for positive pole and a contact member 128 for negative pole which comprise metal plates and are resiliently deformable in the direction of thickness of the batteries 10a and 10b are secured to the ceiling 120b and the floor 120c, respectively, and the ends thereof are bulged to provide contacts 126a and 128a. Another contact member 136 supported on the body serves also as a partition and, as shown in FIG. 11B, the upper and lower portions of centrally secured electrically conductive rubber form contacts 136a and 136b, respectively. During the insertion and removal of the batteries 10a and 10b, the contacts 136a and 136b of the contact member 136 are not resiliently deformed, but the contacts 126a and 128a of the ceiling 120b and floor 120c are resiliently deformed.

Figure 11E:
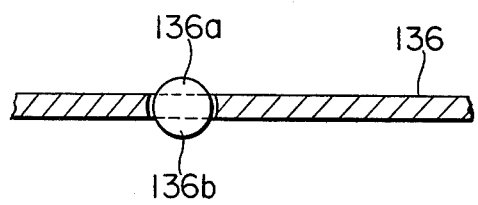
Figure 11F:
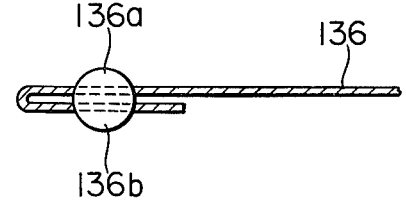

The contact member 136 may be one provided by forming an aperture in a planar member of relatively great thickness and forming contacts 136a and 136b on a spherical member of electrically conductive material mounted in the aperture, as shown in FIG. 11E, or one provided by forming an aperture in the overlapping portion of a planar member 136 of relatively small thickness having the end portion thereof turned back and forming contacts 136a and 136b on a spherical member mounted in the aperture, as shown in FIG. 11F.

In FIG. 12C, the windows 7a, 7b for the positive pole and the windows 8a, 8b for the negative pole of the batteries 10a and 10b are provided at different positions in the obverse and reverse positions of the batteries and therefore, the positions of the contact 126a of the ceiling 120b and the contact 128a of the floor 120c, in the left to right direction are changed, and a contact 136a for the negative pole and a contact 136b for the positive pole are formed at different positions on the contact member 136 serving as a partition by a bulging work. In this case, during the insertion and removal of the batteries 10a and 10b, the contacts 126a and 128a and the contacts 136a and 136b are resiliently deformed.

Figure 13:
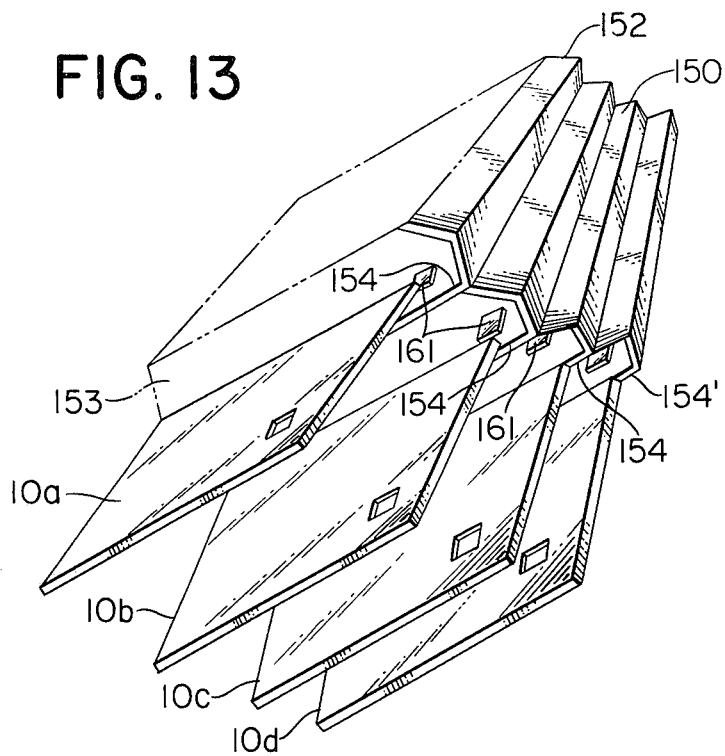
FIG. 13 is a perspective view showing a bellows structure used in another embodiment of the present invention.
Figure 14A:
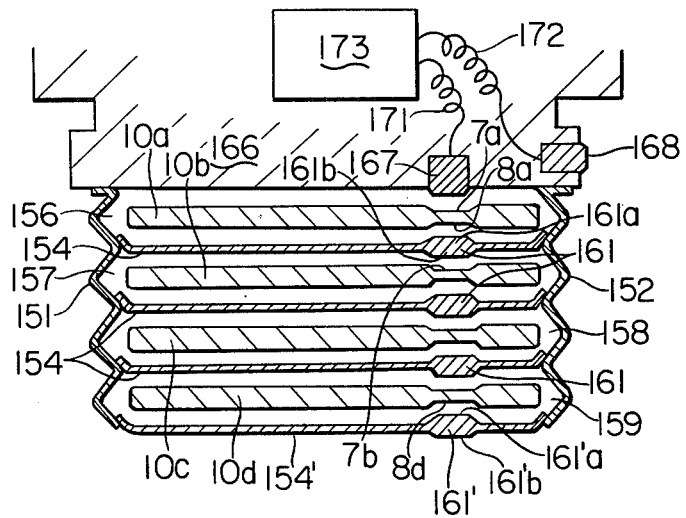
FIGS. 14A and 14B are cross-sectional views of an embodiment using the structure of FIG. 13.
Figure 14B:
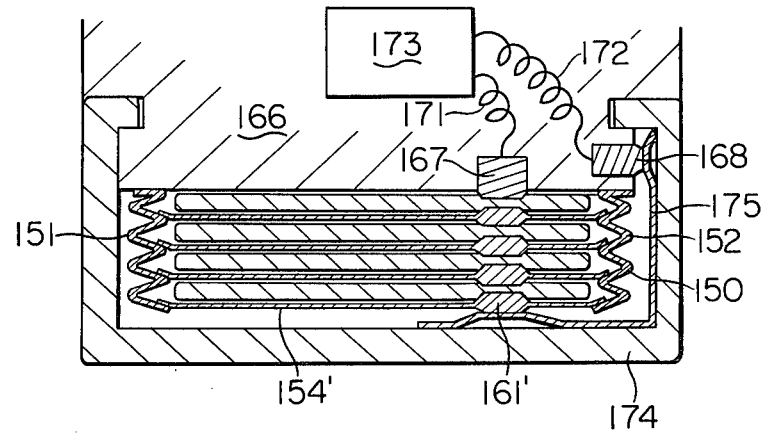

Reference is now had to FIGS. 13, 14A and 14B to describe a further embodiment of the present invention. The space defined by the bellows 151, 152 on the opposite sides of a bellows structure 150 and the forward bellows (not shown) of the bellows structure is divided into a plurality of battery containing chambers 156, 157, 158 and 159 by a plurality of partitions 154 of electrically non-conductive material extended between the bellows 151 and 152 on the opposite sides, and a contact member 161 of electrically conductive material is attached to a corner of each partition 154. As is apparent from FIG. 13, the rear end of the bellows structure is formed as an opening portion 153 through which batteries 10a, 10b, 10c and 10d (identical to the battery 10) may be inserted and removed. The structure 50 is attached to the underside of a device body 166.

A contact 167 for the positive pole and a contact 168 for the negative pole are secured to the underside and side surface, respectively, of the device body 166, and these contacts are connected to an electric circuit 173 by lead wires 171 and 172, respectively. A metal plate 175 of L-shaped cross section is secured to a lid member 174 removably mountable to the device body 166 and, when the lid member 174 has been mounted to the device body 166, one end thereof may contact the contact 168 and the other end thereof may contact the contact member 161' of a plate member 154' similar in construction to the partitions 154 and lying at the lowermost position in the bellows 150.

When the batteries 10a, etc. are to be inserted into the containing chambers 156, etc., the lid member 174 is removed from the device body 166 and the bellows 151 and 152 are stretched vertically, whereafter the batteries 10a, etc. are inserted into the containing chambers 156, etc. through the opening portion 153. When the batteries 10a, etc. have been inserted to a predetermined position, the bellows 151 and 152 is contracted and the lid member 174 is mounted to the device body 166. Thereupon, as shown in FIG. 14B, the contact 167 for the positive pole on the device body 166 side fits into the window 7 for the positive pole of the uppermost battery 10, and the contact 161a for the negative pole of the contact member 161 on the uppermost partition member 154 fits into the window 8 for the negative pole of this battery 10. The contact 161b for positive pole of the contact member 161 fits into the window 7b for the positive pole of the second battery 10b from above. This relation between the contact member and the window of the battery also holds true of the third battery 10c from above, but it is the contact 161a' for the negative pole of the contact member 161' on the lowermost plate member 154' that fits into the window 8d for the negative pole of the lowermost battery 10d, and the contact 161b' for the positive pole of this contact member 161' is brought into contact with the end of the metal plate 175. In this manner, the batteries between the contacts 167 and 168 are series-connected, whereby a predetermined high voltage is derived at the electric circuit 173.

If the lid 174 is made of an electrically conductive material and a part thereof is brought into contact with the contact 161 of the lowermost plate member 154' and the device body 166 is formed of an electrically conductive material and the negative pole side of the circuit 173 is directly earthed to the device body 166, then a current can flow through the lid 174 and the body 166 when the lid 174 has been mounted, and power can be supplied to the electric circuit 173 without the lead wire 172 being provided between the lid 174 and the device body 166.

Also, if the lowermost plate member 154 and the bellows 152 are formed of an electrically conductive material and the bellows 152 and the negative pole terminal 168 are connected together, the contact 168 and the circuit 173 can be connected together by the lead wire 172 or the earthed device body 166. The contact 161 may of course be replaced by a contact of the shape shown in any of FIGS. 11A–11F.

Figure 15:
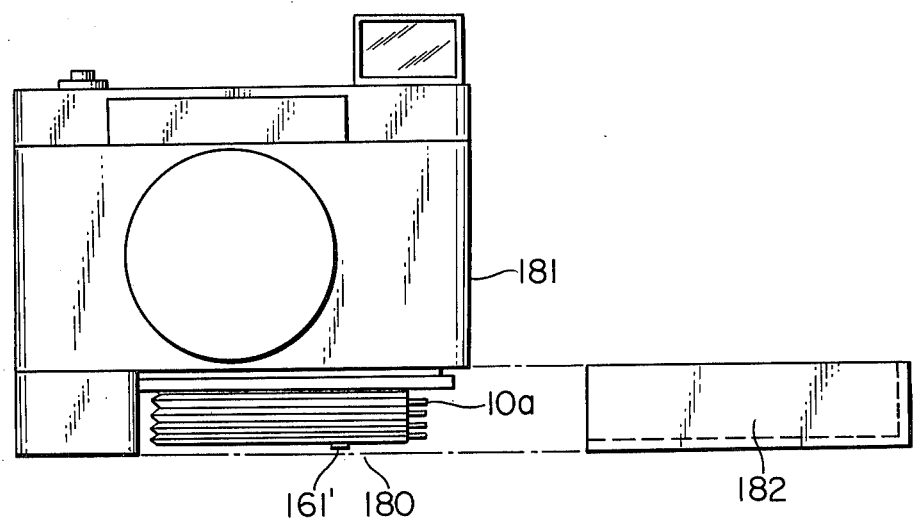
FIG. 15 illustrates the FIG. 14 embodiment as applied to a camera.

FIG. 15 shows an example in which the embodiment shown in FIGS. 13, 14A and 14B is applied to the bottom portion of a camera. A camera body 181 is the device body 166 and a bottom cover 182 corresponds to the lid member 174. A bellows structure 180 is attached to the bottom surface of the camera body 181 and a contact 161' is provided on the lowermost surface thereof. In a condition in which the batteries 10a, etc. are contained in the containing chambers of the bellows structure 180, the rear ends of the batteries slightly project from the containing chambers. If the bottom cover 182 is mounted, the power source will be connected to the electric circuit in the camera body and the bellows structure 180 will be completely covered and thus, the camera will present an aesthetic appearance.

Some modern cameras contain therein a metering device, an automatic exposure device, a strobo, an automatic film feeding device, etc. and sometimes require a high voltage, and according to such battery container device, a high voltage can be contained while the size of the container device itself is minimized.

Figure 16:
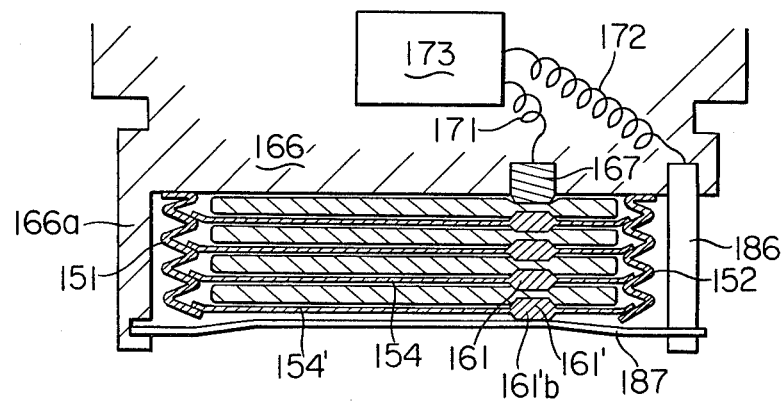
FIG. 16 is a cross-sectional view corresponding to FIG. 14 but showing another embodiment of the present invention.

FIG. 16 shows a part modification of the embodiment shown in FIGS. 14A and 14B. A shaft-like member 186 made of an electrically conductive material is secured to the device body 166 and an extension 166a is formed on a part of the body, and a plate spring 187 made of an electrically conductive material extends between the shaft-like member 186 and the extension 166a. The contact 161b' for the negative pole of the contact 161' of the lowermost plate member 154' is in contact with the plate spring 187 and the shaft-like member 186 is connected to an electric circuit 173 and therefore, if bellows 151 and 152 are closed and the plate spring 187 is brought to below the contact 161' as shown, a high voltage will be derived at the circuit 173 through the contacts 167, 161', the plate spring 187 and the member 186. During the insertion and removal of the battery 10, the plate spring 187 is disengaged from the extension 166a and pivoted about the shaft-like member 186, whereby the bellows 151 and 152 are stretched downwardly. A lid member 174 similar to that previously described may be mounted to the device body 166. In that case, the plate spring 174 is unnecessary.

Figure 17:
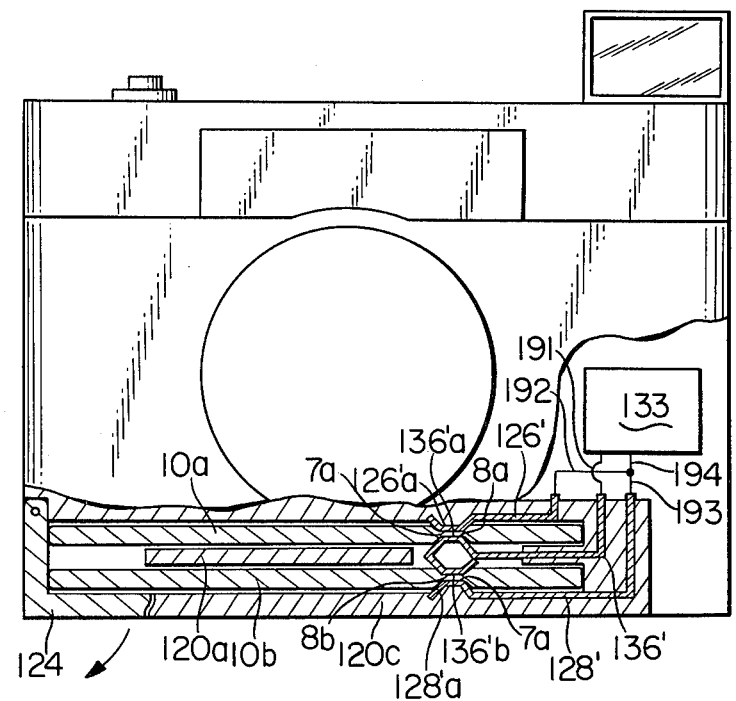
FIG. 17 is a view partly in cross section illustrating still another embodiment of the present invention.

All of the embodiments hitherto described have been ones in which planar batteries are seriesconnected. FIG. 17 shows an embodiment in which a plurality of planar batteries are parallel-connected. This embodiment differs in the following points from the embodiment shown in FIG. 9. Planar batteries 10a and 10b are inserted so that the windows 7a and 7b for the positive poles thereof face outward and the windows 8a and 8b for the negative poles thereof face each other. 126a' and 128a' are fitted into the windows 7a and 7b for the positive pole, respectively, of the batteries 10a and 10b, and 136a' and 136b' are fitted into the windows 8 and 8' for the negative pole, respectively, of the batteries 10a and 10b. One end of 136' is connected to the negative pole terminal of a circuit 133 through lead wire 191, and 126' and 128' are connected to each other by lead wires 192 and 193 and also connected to the positive pole terminal of the circuit 133 by lead wire 194.

In the present embodiment, the batteries 10a and 10b are parallel-connected in this manner and power is supplied to the circuit 133. In the other points, the present embodiment is entirely the same as the embodiment of FIG. 9. However, as is apparent from the partial cross-sectional view of FIG. 17, the windows of the battery 10b are provided at positions different from the windows of FIGS. 1 and 2.

Figure 18:
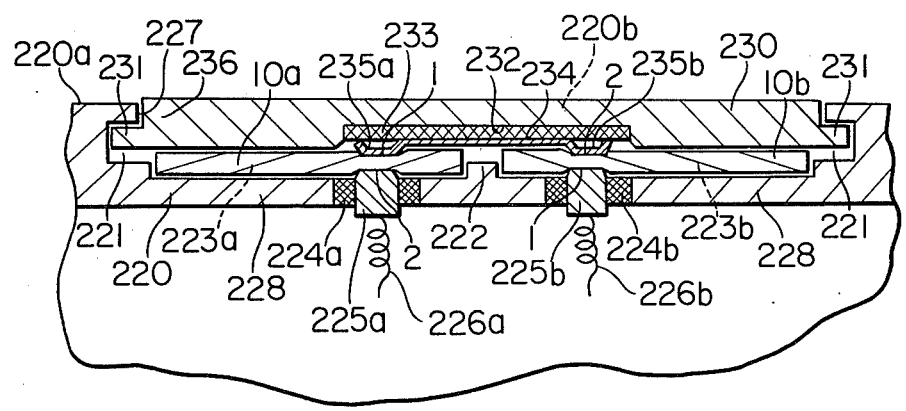
FIGS. 18–21 are cross-sectional views showing further embodiments of the present invention.

Referring now to FIG. 18, an outwardly opening, laterally elongate, concave space 220b is formed in the outer wall 220a of a device body 220. Recesses 221 are formed at the opposite sides of this laterally elongate space and a protrusion 222 is formed centrally of a floor 228, and said space is defined by two containing chambers (containing spaces) 223a and 223b. A shaft-like negative pole contact 225a and a shaft-like positive pole contact 225b are attached to the floor on the opposite sides of the protrusion 222 by insulating members 224a and 224b, and one end of each contact 225a, 225b projects into the containing chamber 223a, 223b and to other end is connected to an electric circuit, not shown, in the device body 220 by lead wire 226a, 226b.

A lid member 230 removably mounted from the outside of the device body 220 has on the opposite sides thereof engaging portions 231 fitted in said recesses 221, and a rectangular recess 232 is formed centrally of the reverse side (in FIG. 18, the lower side) of the lid member. An insulating member 233 is fitted in the recess 232 and a plate spring-like elongate contact member 234 is attached to the insulating member. The opposite ends of the contact member 234 are bulged downwardly to provide a contact 235a for positive pole and a contact 235b for negative pole.

In order that batteries 10a and 10b (actually identical in configuration to the battery 10) may be contained in the device body 220, one battery 10a is received into the containing chamber 223a with the terminal for the positive pole thereby facing upward and the other battery 10b is received into the containing chamber 223b with the contact 2 for the negative pole facing upward. Thereupon, the contact 225a for the negative pole contacts the terminal 2 of the battery 10a and the contact 225b for the positive pole contacts the terminal 1 of the battery 10b. At this time, the batteries 10a and 10b are positioned in predetermined conditions by the side walls of the containing chambers 223a and 223b and the contacts 225a and 225b.

Next, when the lid member 230 is mounted to the device body 220 with the engaging portion 231 thereof engaged with the engaging portion 21, the contact 235a for the positive pole and the contact 235b for the negative pole respectively come into contact with the terminal 1 of the battery 10a and the terminal 2 of the battery 10b. The lid member 230 is positioned by the engagement between a stepped portion 236 and an opening portion 227 and by the contacts 235a and 235b. The contacts 235a and 235b are resiliently deformable in the direction of thickness of the batteries 10a and 10b and therefore bias the batteries 10a and 10b against the floor 228 of the device body 220 while, at the same time, the lid member 230 receives the reaction force thereof to ensure more reliable engagement between the engaging portion 231 and the upper wall surface of the recess 221. Thus, the batteries 10a and 10b are series-connected by the contacts 225a, 225b and the contacts 235a, 235b and a predetermined voltage is derived at the unshown circuit in the device body 220.

According to the present embodiment, the containing chambers 223a and 223b form an angle of 180° (that is, are formed in the same plane) and two batteries 10a and 10b are contained adjacent to each other in the same plane with the shorter sides thereof provided with electrodes being close to each other, and if the batteries are so contained, the entire device does not become larger in the direction of thickness of the batteries and thus, compactness and thinness of the device can be achieved.

It is also possible to endow the contacts 225a and 225b of the device body 220 side, instead of the contacts 235a and 235b of the lid member 230 side, with resilient deformability or to make the contacts 225a, 225b and the contacts 235a, 235b resiliently undeformable and instead endow the lid member 230 with resilient deformability.

Figure 19:
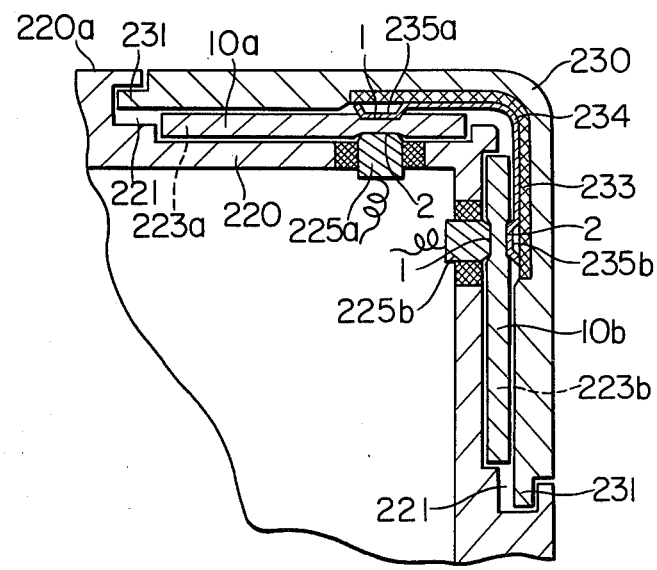

Another embodiment of the present invention shown in FIG. 19 differs from the above-described embodiment in that batteries 10a and 10b are contained not in the same plane but in two planes orthogonal to each other. That is, the outer wall 220a of the device body 220 is bent so that its cross section is L-shaped and as a result, two containing chambers 223a and 223b are formed so that one of them, 223a, and the other containing chamber 223b are orthogonal to each other in a horizontal plane and in a vertical plane, respectively (as viewed in FIG. 19). Each of the containing chambers 223a and 223b opens outwardly as shown in FIG. 19. Correspondingly thereto, a lid member 230 and a contact member 234 are also bent so that their cross sections are L-shaped, but in the other points, this embodiment is basically identical to the above-described embodiment and therefore, corresponding parts are given similar reference numerals and need not be described in detail.

A feature of the present embodiment is that two batteries 10a and 10b are contained in orthogonal relationship with each other by effectively utilizing the narrow space at a corner of the device and can be series-connected.

Description has hitherto been made of a case where planar batteries are series-connected and power is supplied to the circuit within the device body 220, while the following embodiment is an example of the parallel connection. In the embodiment shown in FIG. 20, one planar battery 10a, like the one shown in FIG. 18, is contained so that the terminal 1 for the positive pole faces upward and is in contact with a contact 235a and the terminal 2 for the negative pole is in contact with a contact 225a. The other planar battery 10b is also disposed so that the terminal 1 for the positive pole faces upward, and contacts 235b and 225b provide the contact for positive pole and the contact for the negative pole, respectively. That is, the planar battery 10b is contained so that the terminal 1 for the positive pole is in contact with the contact 235b for positive pole and the terminal 2 for the negative pole is in contact with the contact 225b for the negative pole. Further, a contact 225c for positive pole is fixed to the device body 220 between the planar batteries 10a and 10b through an insulating member 224c, and a bulged portion 235c is formed on the contact member 234 so that it can contact the contact 225c for the positive pole. This bulged portion constitutes a contact 235c for the positive pole.

Figure 20:
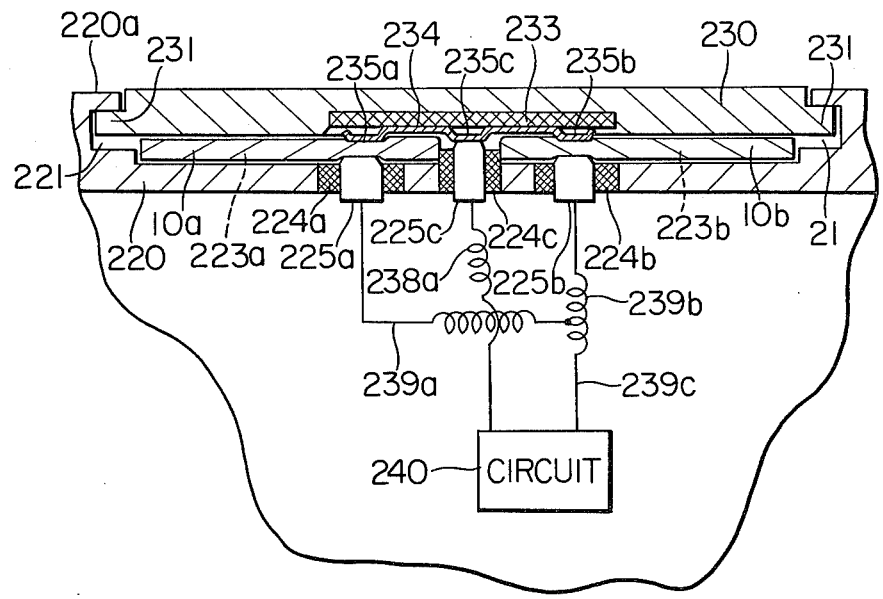

Accordingly, when the containing chambers 223a and 223b are covered with a lid member 230 as shown in FIG. 20, the contacts 235a and 235b for positive pole are connected to the terminals 1 for the positive pole, respectively, of the planar batteries 10a and 10b, and the positive voltages of the terminals 1 are put out through the contact member 234 and the contact 235c to the contact 225c for the positive pole which is in contact with the contact 235c. The terminals 2 for the negative pole of the planar batteries 10a and 10b are in contact with the contacts 225a and 225b for the negative pole, respectively, which put out the negative voltages of the planar batteries 10a and 10b. Lead wire 239a connected to the contact 225a for the negative pole is connected to lead wire 239b connected to another contact 225b for the negative pole, and the point of connection thereof is connected to the negative terminal of a circuit 240 in the device body by lead wire 239c. Lead wire 238a connected to the contact 225c for the positive pole is connected to the positive terminal of the circuit 240. Accordingly, the output voltages of the parallel-connected planar batteries 10a and 10b are applied to the circuit 240. In the other points, the embodiment of FIG. 20 is entirely identical to the embodiment of FIG. 18.

The angle formed by the two containing chambers 223a and 223b can of course be selected to any other angle than 90° or 180° as required (but an angle of 0° is excluded because it means that the two containing chambers are superposed one upon the other in the form a layer).

In the present embodiment, the outer wall 220a is formed in a cylindrical shape and the present invention also includes a case where the battery containing chambers are formed along such cylindrical outer wall. Since the planar batteries are deformable, the battery containing chambers may be formed in such a shape.

While the above embodiments have hitherto been described with respect to a case where the terminal for the positive pole is provided on one surface of a planar battery and the terminal for the negative pole is provided on the outer surface, the present invention is also applicable to a case where the two terminals are provided on one surface of a planar battery.

Also, the embodiments have been described with respect to a case where two planar batteries are connected, but the present invention is also applicable to a case where three or more planar batteries are connected.

It is not indispensable that the containing chambers 223a and 223b are formed by the device body 220 and the lid member 230, but the outer wall 220a and the lid member 230 may be formed integrally with each other, and the planar batteries 10a and 10b may be inserted into the containing chambers 223a and 223b from the direction perpendicular to the plane of the drawing sheet.

As has been described above, according to the present invention, a plurality of batteries are contained while being juxtaposed along the outer wall and therefore, two or more batteries can be series- or parallel-connected and contained with the dimensions of the device in the direction of thickness of the batteries being minimized.

Figure 21:
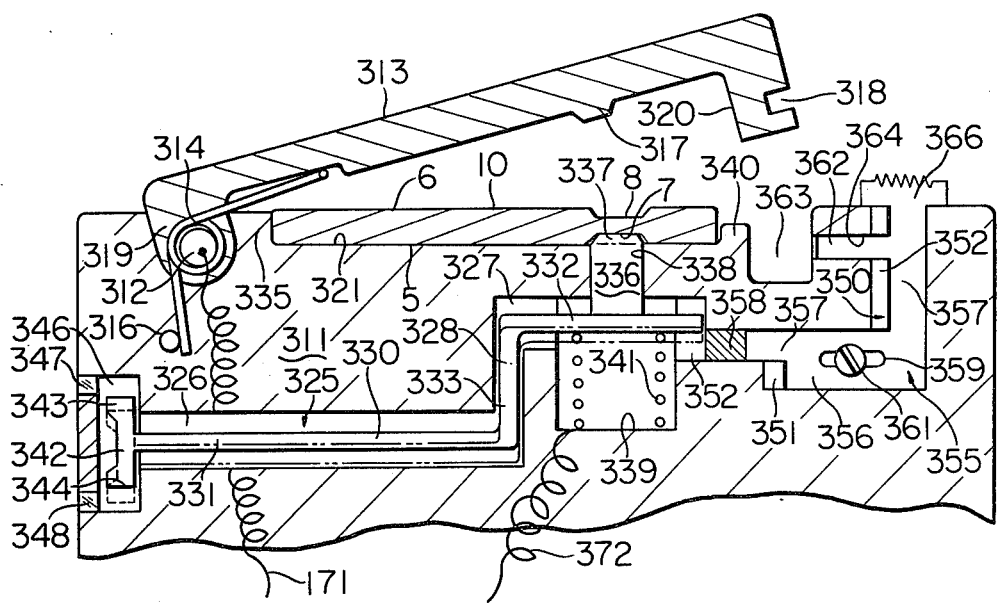

FIG. 21 shows a further embodiment of the present invention. The bent mounting portion 319 of one end of a lid 313 is pivotally mounted to a battery chamber body 311 by means of a shaft 312 made of an electrically conductive material, and the lid 313 is pivotable about the shaft 312. A torsion spring 314 made of an electrically conductive material is attached to the shaft 312, one end of the torsion spring 314 being in contact with a pin 316 studded in the body 311 and the other end being in contact with the reverse side of the lid 313 and biasing the lid 313 in a direction to open the same.

The lid 313 is made of an electrically nonconductive material and the free end thereof is formed with a bent portion 320 bent in a perpendicular direction, and a contact portion 317 for negative pole is projectedly provided slightly toward the pivoted portion from the free end and is electrically connected to the shaft 312 by a lead wire, not shown. A recess 318 is formed in one side surface of the bent portion 320.

On the other hand, in the battery chamber body 311, there are formed a groove-shaped space 321 for containing therein a battery 310 by a stepped portion 335 and a protrusion 340, a bent space 325 for containing therein a display member 330, and a bent space 350 for containing therein a locking member 355. The space 325 generally comprises horizontal portions 326 and 327 and a vertical portion 328 connecting the two horizontal portions, and the display member 330 bent into a shape similar to the space 325 is contained therein. That is, the display member 330 comprises horizontal portions 331 and 332 and a vertical portion 333 connecting the two horizontal portions. The horizontal portions 326 and 327 of the space 325 are considerably high as compared with the thickness of the horizontal portions 331 and 332 of the display member 330, while the width of the vertical portion 328 is substantially equal to the width of the vertical portion 333 of the display member 330, and the display member 330 is movable in vertical direction (up and down in FIG. 21) with the vertical portion 333 thereof guided by the vertical portion 328 of the space 325.

A contact member 336 for positive pole is studded in the upper surface of the horizontal portion 332 of the display member and the upper end surface thereof provides a contact portion 337. This contact member 336 is fitted in a guide hole 338 formed in the body 311 and, with vertical movement of the display member 330, the contact portion 337 may appear and disappear from the bottom surface of the space 321. The upper surface of a compression coil spring 341 contained in the space 339 is in contact with the lower surface of the horizontal portion 332 and the display member 330 is normally biased upwardly thereby.

On the other hand, a vertically extending index mark portion 342 is formed on the end portion of the horizontal portion 331 of the display member, and the upper and lower ends thereof provide index marks 343 and 344. Correspondingly thereto, a wide opening 346 is formed in the horizontal portion 326 of the space 325 to permit movement of the index mark portion 342 of the display member. A pair of display windows 347 and 348 are formed at the entrance portion of the opening 346.

Another space 350 of the battery chamber body 311 generally comprises a horizontal portion 351 and a vertical portion 352, and a locking member 355 also comprising a horizontal portion 356 and a vertical portion 357 is contained therein. More particularly, a space 352 of relativey low height is continuously formed in the horizontal portion 351 of the space 350 and communicates with said horizontal portion 327. Accordingly, a protrusion 357 also of low height is provided on the horizontal portion 356 of the locking member and the fore end thereof provides an insulating portion 358. The horizontal portion 351 of the space is longer than the horizontal portion 356 of the member. A laterally elongate slot 359 is formed in the horizontal portion 356 and a pin 361 fixed to the battery chamber body 311 extends through this slot.

The width of the vertical portion 357 of the locking member 355 is smaller than the width of the vertical portion 352 of the space 350 and a protrusion 362 provided laterally from the vertical portion 357 is fitted in a guide hole 364 formed in communication with a recess 363 formed correspondingly to the bent portion 320 from the vertical portion 352. The locking member 355 is laterally movable by applying a force to an operating portion 366.

The operation of the present embodiment will now be described.

When a battery 10 is received into the space 321 in its regular state and the lid 313 is closed against the action of the spring 314, the contact portion 317 for the negative pole fits into the window 8 and urges the battery 10 against the recess 321 while, at the same time, the bent portion 320 fits into the recess 363. Subsequently, when the locking member 355 is leftwardly shifted to bring the protrusion 362 thereof into engagement with the recess 318, the lid 313 is locked and can no longer open naturally.

At this time, the display member 330 is prevented from moving up any further by the action of the spring 341 with the contact portion 337 for the positive pole fitted into the window 7 and, when the locking member 355 is shifted, the insulating portion 358 at the end of the protrusion advances under the horizontal portion 332 and the display member 330 becomes vertically immovable. In this condition, neither of the index marks 343 and 344 appears in the display window 347 or 348 and the display member displays that the battery 10 is contained in the regular state. The voltage of the battery 10 is taken out at a circuit, not shown, through lead wire 371 connected to the shaft 312 and lead wire 372 connected to the spring 341.

To interchange the battery 10, the locking member 355 is shifted rightwardly. Thereupon, the engagement between the protrusion 362 and the recess 318 is released (and at the same time, the engagement between the insulating portion 358 and the horizontal portion 332 is also released), and the lid 313 automatically opens due to the action of the spring 314. Along therewith, the battery 10 is also raised from the space 321 by the contact portion 337 of the display member moving up due to the action of the spring 341, so that the battery can be taken out by picking the end thereof by fingers. Even when one tries to close the lid 313 in spite of the battery 10 having been contained in a wrong direction, one can immediately know that. That is, when the battery 10 has been contained with the windows 7 and 8 not opposed to the contact portions 317 and 337 (when the battery has been contained with its left and right sides reversed as viewed in FIG. 21), the contact portion 317 directly bears against the film 6 of the battery 10 and therefore, the lid 313 cannot be fully closed and accordingly, the locking member 355 cannot be shifted. Also, at this time, the protrusion 336 contacts the film 5, so that the display member 330 is in its lowered position and the index mark 344 appears in the display window 348 to display that the battery 10 is contained erroneously.

On the other hand, when the lid 313 has been closed and locked in spite of the battery 10 being not contained (in such case, the lid 313 can be fully closed and therefore, the locking member 355 can be slidden to bring the protrusion 362 into engagement with the recess 318), the display member 330 moves up due to the action of the spring 341 until the contact portion 337 bears against the reverse side of the lid 313, whereupon the index mark 343 appears in the display window 347 to display that the battery 10 is not contained.

It will be understood that various changes or improvements may be made in the details of the present invention. For example, if the lid 313 itself is formed of an electrically conductive material, it will become unnecessary to connect the contact portion 317 and the shaft 312 by a lead wire as in the above-described embodiment and in such case, it is meaningful that particularly the end of the protrusion 357 has been made into an insulating portion 358. In this case, if the locking member 355 is made of an electrically conductive material, the lead wire 371 can also be connected to the locking member 355. The locking means is not restricted to the slide type as in the above-described embodiment, but may be of the type which utilizes the so-called snap action to lock. In the case of the slide type, the locking member 355 may also be attached to the lid 313 side. The windows 7 and 8 for the positive pole and the negative pole of the battery 10 need not always be formed in the opposite surfaces thereof but may be formed in the same surface thereof and in that case, correspondingly to the windows, the contact portions 317 and 337 may both be provided on the body 311 side or on the lid 313 side. The lid 313 need not always be pivotally mounted but may be designated to more toward or away from the body 311 while remaining parallel thereto to thereby open or close the containing space 321. Further, when the contact portion 317 is provided on the lid 313, this contact portion can be made movable in the direction of thickness of the lid 313 or the contact portion 336 can be provided on the body 311.

We claim:

1. A device capable of containing at least one planar battery having a positive electrode and a negative electrode and capable of supplying a power to a circuit when said battery has been completely contained, said device including:
   (a) a plurality of terminals for contacting said positive electrode and said negative electrode, respectively, of said battery when completely contained;
   (b) means for holding each of said plurality of terminals, said holding means holding at least one of said terminals movably between a first position and a second position, and wherein said movable terminal, when in said first position, contacts neither of said positive electrode and said negative electrode and, when in said second position, can contact one of said electrodes; and
   (c) means for moving said movable terminal to said second position in response to the containment of said battery.

2. A device according to claim 1, wherein said means for moving moves said movable terminal from said second position to said first position in response to the release of the containment of said battery.

3. A device according to claim 1, further including means for displaying the contained condition of said battery.

4. A device according to claim 1, wherein said means for moving includes means for biasing said movable terminal in the direction from said second position to said first position.

5. A device according to claim 1, further including means for holding said battery in its contained condition in response to the movement of said movable terminal to said second position.

6. A device capable of containing at least one planar battery having two surfaces each formed with a depression and having a positive electrode in one of said two depressions and a negative electrode in the other of said two depressions, and capable of supplying a power to a circuit when said battery has been completely contained, said device including:
   (a) a plurality of terminals for contacting said positive electrode and said negative electrode, respectively, of said battery when completely contained;
   (b) means for holding each of said plurality of terminals, said holding means holding at least one of said terminals movably between a first position and a second position, and wherein said movable terminal, when in said first position, contacts neither of said positive electrode and said negative electrode and, when in said second position, can contact one of said electrodes; and
   (c) means for moving said movable terminal to said second position in response to the containment of said battery.

7. A device according to claim 6, wherein said plurality of terminals include engaging means adapted to engage the depressions of said battery and fix said battery in its contained condition.

8. A device capable of containing in a chamber at least one planar battery having two surfaces each formed with a depression and having a positive electrode in one of said two depressions and a negative electrode in the other of said two depressions, whereby the shape of said battery is asymmetric in any of three-dimensional directions, and capable of supplying a power to a circuit only when said battery has been contained in a predetermined direction relative to said chamber, said device including:
   (a) a plurality of terminals for contacting said positive electrode and said negative electrode, respectively, of said battery when completely contained;
   (b) means for holding each of said plurality of terminals, said holding means holding at least one of said terminals movably between a first position and a second position, and wherein said movable terminal, when in said first position, contacts neither of said positive electrode and said negative electrode and, when in said second position, can contact one of said electrodes; and
   (c) means for moving said movable terminal to said second position in response to the containment of said battery.

9. A device according to claim 8, wherein said plurality of terminals include engaging means adapted to engage the depressions of said battery and fix said battery in its contained condition.

10. A device according to claim 9, further including means for blocking said engagement when said battery has been contained in a direction different from said predetermined direction relative to said chamber.

11. A device capable of containing a plurality of planar batteries each having a pair of electrodes, one of said electrodes being provided on one surface and the other of said electrodes being provided on the other surface, said device including:
    (a) a device for driving by the power supplied from said plurality of batteries and a box member having a wall surrounding said driving device, said wall having a first and a second inner wall, said first and second inner walls being opposed to each other to form a clearance capable of containing said plurality of batteries in a direction orthogonal to the surface of said batteries; and (b) means capable of supplying the power of said plurality of batteries to said driving device when said plurality of batteries have been contained in said clearance, said supply means including:
a first terminal provided on said first inner wall to be electrically connected to one electrode of one of said plurality of batteries;
a second terminal provided on said second inner wall to be electrically connected to one electrode of another of said plurality of batteries; and
an electrically conductive member provided between said first and said second inner wall to electrically connect the other electrode of said one battery and the other electrode of said another battery.

12. A device capable of containing a plurality of planar batteries each having a positive electrode on one surface and a negative electrode on the other surface, said device including:

(a) a device for driving by the power supplied from said plurality of batteries and a box member having a wall surrounding said driving device, said wall being formed with a clearance therealong for containing said plurality of batteries so that the surface of said batteries is along said wall; and (b) electrical connecting means provided on said wall so as to be electrically connectable to said positive electrodes and said negative electrodes of said plurality of batteries to supply the power of said plurality of batteries to said driving device when said plurality of batteries have been contained in said clearance.

13. A device according to claim 12, wherein said wall includes a lid for exposing said clearance.

14. A device for containing in a predetermined direction a planar battery having a positive electrode on one surface and a negative electrode on the other surface, the shape of said battery being asymmetric in any of three-dimensional directions, said device including:

(a) means capable of holding said battery when said battery has been contained;

(b) detecting means for detecting the direction in which said battery has been contained and putting out a detection signal; and (c) means for blocking said holding in response to said detection signal when said battery has been contained in any other direction than said predetermined direction.

* * * * *

UNITED STATES PATENT AND TRADEMARK OFFICE
CERTIFICATE OF CORRECTION

PATENT NO. : 4,436,792
DATED : March 13, 1984
INVENTOR(S) : NAOKI TOMINO, ET AL.

It is certified that error appears in the above-identified patent and that said Letters Patent is hereby corrected as shown below:

Column 7, line 29, delete "surfaces"; same line, after "reverse" insert --surfaces--.

Column 12, line 17, change "to" to --the--.

Column 14, line 34, change "outer" to --other--.

Column 16, line 65, change "slidden" to --shifted--.

Column 17, line 27, change "designated" to --designed--; same line, change "more" to --move--.

Signed and Sealed this

Third Day of July 1984

[SEAL]

Attest:

Attesting Officer

GERALD J. MOSSINGHOFF

Commissioner of Patents and Trademarks